(12) United States Patent
Kang et al.

(10) Patent No.: US 8,531,183 B2
(45) Date of Patent: Sep. 10, 2013

(54) ROTARY ENCODER AND CONTROL METHOD THEREOF

(75) Inventors: Kyu Tae Kang, Suwon-si (KR); Yeong Bae Yeo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 13/025,824

(22) Filed: Feb. 11, 2011

(65) Prior Publication Data
US 2011/0199074 A1    Aug. 18, 2011

(30) Foreign Application Priority Data
Feb. 12, 2010  (KR) .................. 10-2010-0013586

(51) Int. Cl.
*G01R 33/032*   (2006.01)
*G01R 33/02*    (2006.01)
*G01B 11/26*    (2006.01)

(52) U.S. Cl.
USPC ..................................... 324/244.1; 356/138

(58) Field of Classification Search
USPC ........................................................ 324/244.1
See application file for complete search history.

(56) References Cited

U.S. PATENT DOCUMENTS
6,291,815 B1 *  9/2001  Sugiyama et al. ....... 250/231.13
2001/0013765 A1 *  8/2001  Yamamoto et al. ........... 318/600

* cited by examiner

*Primary Examiner* — Bot Ledynh
(74) *Attorney, Agent, or Firm* — Sughrue Mion PLLC (57) ABSTRACT

The control method includes obtaining an assumed angle and an actual angle of each of the plurality of rotation angle detecting members, determining a first rotation angle detecting member, the assumed angle and the actual angle of which differ from each other, determining a second rotation angle detecting member having the actual angle closest to the assumed angle of the first rotation angle detecting member, resetting the given count value of the second rotation angle detecting member to a new count value of the first rotation angle detecting member, changing the actual angle of the first rotation angle detecting member via the new count value of the first rotation angle detecting member to reduce an angular error between the assumed angle and the actual angle of the first rotation angle detecting member.

15 Claims, 9 Drawing Sheets

FIG. 2A $\theta 11 = \theta 12 = \theta 13 = \theta 14 = \ldots\ldots = \theta 24 = \theta 25 = \theta 26$

| COUNT VALUE ($n_x$) | ASSUMED ANGLE ($a_0$) | ACTUAL ANGLE ($a_x$) | ANGULAR ERROR ($e_x=a_0-a_x$) | | CORRECTED COUNT VALUE ($n_x'$) | CORRECTED ACTUAL ANGLE ($a_x'$) | ANGULAR ERROR AFTER CORRECTION ($e_x'=a_0-a_x$) |
|---|---|---|---|---|---|---|---|
| 0 | 0 | 0 | 0 | | 0 | 0 | 0 |
| 1 | 0.09 | 0.090255 | 0.000255 | | 1 | 0.090255 | -0.00026 |
| 2 | 0.18 | 0.180438 | 0.000438 | | 2 | 0.180438 | -0.00044 |
| 3 | 0.27 | 0.270693 | 0.000693 | | 3 | 0.270693 | -0.00069 |
| 4 | 0.36 | 0.360876 | 0.000876 | | 4 | 0.360876 | -0.00088 |
| 5 | 0.45 | 0.451132 | 0.001132 | | 5 | 0.451132 | -0.00113 |
| 6 | 0.54 | 0.541314 | 0.001314 | | 6 | 0.541314 | -0.00131 |
| 7 | 0.63 | 0.631497 | 0.001497 | | 7 | 0.631497 | -0.0015 |
| 8 | 0.72 | 0.72168 | 0.00168 | | 8 | 0.72168 | -0.00168 |
| 9 | 0.81 | 0.811863 | 0.001863 | | 9 | 0.811863 | -0.00186 |
| ... | ... | ... | ... | ... | ... | ... | ... |
| 188 | 16.92 | 16.96452 | 0.044521 | | 188 | 16.96452 | -0.04452 |
| 189 | 17.01 | 17.05478 | 0.044777 | | 189 | 17.05478 | -0.04478 |
| 190 | 17.1 | 17.1451 | 0.045104 | | 189 | 17.05478 | 0.045223 |
| 191 | 17.19 | 17.23543 | 0.045432 | | 190 | 17.1451 | 0.044896 |
| ... | ... | ... | ... | ... | ... | ... | ... |
| 555 | 49.95 | 50.08453 | 0.134528 | | 554 | 49.9942 | -0.0442 |
| 556 | 50.04 | 50.17478 | 0.134784 | | 555 | 50.08453 | -0.04453 |
| 557 | 50.14 | 50.26511 | 0.135111 | | 555 | 50.08453 | 0.045472 |
| 558 | 50.22 | 50.35537 | 0.135367 | | 556 | 50.17478 | 0.045216 |
| ... | ... | ... | ... | ... | ... | ... | ... |

FIG. 6B

| | | | | | | | |
|---|---|---|---|---|---|---|---|
| 1162 | 104.58 | 104.8049 | 0.224918 | | 1160 | 104.6247 | -0.0447 |
| 1163 | 104.67 | 104.895 | 0.224956 | | 1161 | 104.7148 | -0.04461 |
| 1164 | 104.76 | 104.9851 | 0.225066 | | 1161 | 104.7148 | 0.045192 |
| 1165 | 104.85 | 105.0751 | 0.225104 | | 1162 | 104.8049 | 0.045082 |
| ... | ... | ... | ... | ... | ... | ... | ... |
| ... | ... | ... | ... | ... | ... | ... | ... |
| 1392 | 125.28 | 125.5051 | 0.22514 | | 1389 | 125.2354 | 0.044611 |
| 1393 | 125.37 | 125.5951 | 0.225105 | | 1390 | 125.3253 | 0.044718 |
| 1394 | 125.46 | 125.685 | 0.224998 | | 1392 | 125.5051 | -0.04514 |
| 1395 | 125.55 | 125.775 | 0.224963 | | 1393 | 125.5951 | -0.04511 |
| ... | ... | ... | ... | ... | ... | ... | ... |
| 1985 | 178.65 | 178.7855 | 0.135504 | | 1983 | 178.6061 | 0.043919 |
| 1986 | 178.74 | 178.8753 | 0.135252 | | 1984 | 178.6958 | 0.044171 |
| 1987 | 178.83 | 178.9649 | 0.134927 | | 1986 | 178.8753 | -0.04525 |
| 1988 | 178.92 | 179.0547 | 0.134675 | | 1987 | 178.9649 | -0.04493 |
| ... | ... | ... | ... | ... | ... | ... | ... |
| 2302 | 207.18 | 207.2256 | 0.045646 | | 2301 | 207.136 | 0.04403 |
| 2303 | 207.27 | 207.3153 | 0.045321 | | 2302 | 207.2256 | 0.044354 |
| 2304 | 207.36 | 207.405 | 0.044996 | | 2304 | 207.405 | -0.045 |
| 2305 | 207.45 | 207.4947 | 0.044672 | | 2305 | 207.4947 | -0.04467 |
| ... | ... | ... | ... | ... | ... | ... | ... |
| 3997 | 359.73 | 359.7294 | -0.00062 | | 3997 | 359.7294 | 0.000621 |
| 3998 | 359.82 | 359.8196 | -0.00044 | | 3998 | 359.8196 | 0.000438 |
| 3999 | 359.91 | 359.9098 | -0.00018 | | 3999 | 359.9098 | 0.000183 |

ROTARY ENCODER AND CONTROL METHOD THEREOF

CROSS-REFERENCE TO RELATED APPLICATION

This application claims priority from Korean Patent Application No. 10-2010-0013586, filed Feb. 12, 2010 in the Korean Intellectual Property Office, the disclosure of which is incorporated herein by reference in its entirety.

BACKGROUND

1. Field

Methods and apparatuses consistent with inventive concepts relate to a rotary encoder to detect the rotation angle or revolutions per minute of a rotor, such as a motor or a wheel, and a control method thereof.

2. Description of the Related Art

A rotary encoder, for example, an optical rotary encoder, includes a disc, which is attached to a motor and has a plurality of slits for light transmission, and an optical sensor, which emits light to the plurality of slits and receives the light transmitted through the plurality of slits.

The rotary encoder functions to detect the rotation angle of a motor by observing electric pulse signals produced as the light passes through the plurality of slits. The rotary encoder determines the number of slits having passed through an optical path from a light source based on the number of pulses and, in turn, determines the rotation angle or revolutions per minute of the disc based on the determined number of slits. To ensure accurate determination of the rotation angle or revolutions per minute, the plurality of slits needs to be formed at accurate positions of the disc.

However, conventional processes to manufacture the disc of the rotary encoder have a high probability of forming the plurality of slits at unintentional positions. Moreover, when the disc having the plurality of slits is deformed by the effect of temperature or humidity or other storage problems, positions of the plurality of slits may be distorted.

The distorted positions of the plurality of slits might make it difficult to accurately detect the rotation angle or revolutions per minute of the disc. In other words, if the position of a specific slit provided to represent a specific rotation angle is distorted, the specific slit might actually indicate an unintentional rotation angle that is different from the specific rotation angle. However, since a control unit of the rotary encoder assumes that the specific slit has the specific rotation angle, the assumed angle of the specific slit may differ from the actual angle of the specific slit. This difference might deteriorate reliability in detection of the rotation angle or revolutions per minute of the rotary encoder.

There is need for methods and apparatuses which compensate for and minimize possible positional error of the encoder.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

According to exemplary embodiments, there is provided a rotary encoder and a control method thereof, which compensate for and reduce angular error between the assumed angle and the actual angle of each of a plurality of slits formed in a disc of the rotary encoder even if positions of the plurality of slits are distorted.

In accordance with an aspect of an exemplary embodiment, a control method of a rotary encoder including a rotation angle detecting unit provided with a plurality of rotation angle detecting members, each of which has a given count value, includes obtaining an assumed angle and an actual angle of each of the plurality of rotation angle detecting members, and determining a first rotation angle detecting member, the assumed angle and the actual angle of which differ from each other, among the plurality of rotation angle detecting members, determining a second rotation angle detecting member having the actual angle closest to the assumed angle of the first rotation angle detecting member, and resetting the count value of the second rotation angle detecting member to a new count value of the first rotation angle detecting member, to reassume the first rotation angle detecting member via the reset count value of the first rotation angle detecting member so as to reduce an angular error between the assumed angle and the actual angle of the first rotation angle detecting member.

The actual angle of each of the plurality of rotation angle detecting members may be obtained by calculating an angle between a reference position and each of the plurality of the rotation angle detecting members from a rotation time taken from the reference position to each of the plurality of the rotation angle detecting members during constant-speed rotation of the rotation angle detecting unit.

The control method may further include rotating the rotation angle detecting unit for a preset time to stabilize a rotation speed of the rotation angle detecting unit if the rotation angle detecting unit begins to rotate to realize the constant speed rotation.

The reference position may be determined by a reference line provided on a microfluidic device that is rotated by a motor.

The reference position may be determined by a reference line (Z-phase) of a motor that rotates the rotation angle detecting unit.

The reference position may be determined by a time when power begins to be supplied to a motor that rotates the rotation angle detecting unit.

The resetting of the count value may be performed on a per power supply beginning time basis if the reference position is determined by the time when power begins to be supplied to the motor.

A lookup table may be generated based on the relationship between the given count value and the reset count value of the first rotation angle detecting member among the plurality of rotation angle detecting members, and may be used to control the rotary encoder.

In accordance with an aspect of another exemplary embodiment, a rotary encoder includes a rotation angle detecting unit provided with a plurality of rotation angle detecting members, each of which has a given count value, and a control unit that obtains an assumed angle and an actual angle of each of the plurality of rotation angle detecting members, determines a first rotation angle detecting member, the assumed angle and the actual angle of which differ from each other, among the plurality of rotation angle detecting members, determines a second rotation angle detecting member having the actual angle closest to the assumed angle of the first rotation angle detecting member, and resets the count value of the second rotation angle detecting member to a new count value of the first rotation angle detecting member, to reassume the first rotation angle detecting member via the reset count value of the first rotation angle detecting member so as to reduce an angular error between the assumed angle and the actual angle of the first rotation angle detecting member.

The rotation angle detecting unit may be a slitted panel that is rotated along with a motor, and the rotation angle detecting members may be a plurality of slits formed in the slitted panel.

The rotary encoder may further include an optical detecting unit that emits light to the plurality of slits of the slitted panel and receives light transmitted through the plurality of slits, to generate an electric pulse whenever light is received.

The control unit may include a timer to detect a time from a reference time to each pulse generation time, a calculator to calculate a rotation angle of the rotation angle detecting unit based on the detected time, and a memory to store data calculated by the calculator.

The timer and the memory may be interior parts of the control unit.

In accordance with an aspect of another exemplary embodiment, a control method of a rotary encoder including a disc provided with a plurality of slits, each of which has a given count value, includes obtaining an assumed angle and an actual angle of each of the plurality of slits, and determining a first slit, the assumed angle and the actual angle of which differ from each other, among the plurality of slits, determining a second slit having the actual angle closest to the assumed angle of the first slit, and resetting the count value of the second slit to a new count value of the first slit, so as to reduce an angular error between the assumed angle and the actual angle of the first slit.

In accordance with an aspect of another exemplary embodiment, a rotary encoder includes a disc provided with a plurality of slits, each of which has a given count value, and a control unit that obtains an assumed angle and an actual angle of each of the plurality of slits, determines a first slit, the assumed angle and the actual angle of which differ from each other, among the plurality of slits, determines a second slit having the actual angle closest to the assumed angle of the first slit, and resets the count value of the second slit to a new count value of the first slit, so as to reduce an angular error between the assumed angle and the actual angle of the first slit.

BRIEF DESCRIPTION OF THE DRAWINGS

The above and/or other aspects will become apparent and more readily appreciated from the following description of certain exemplary embodiments, with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

Figure 1A:
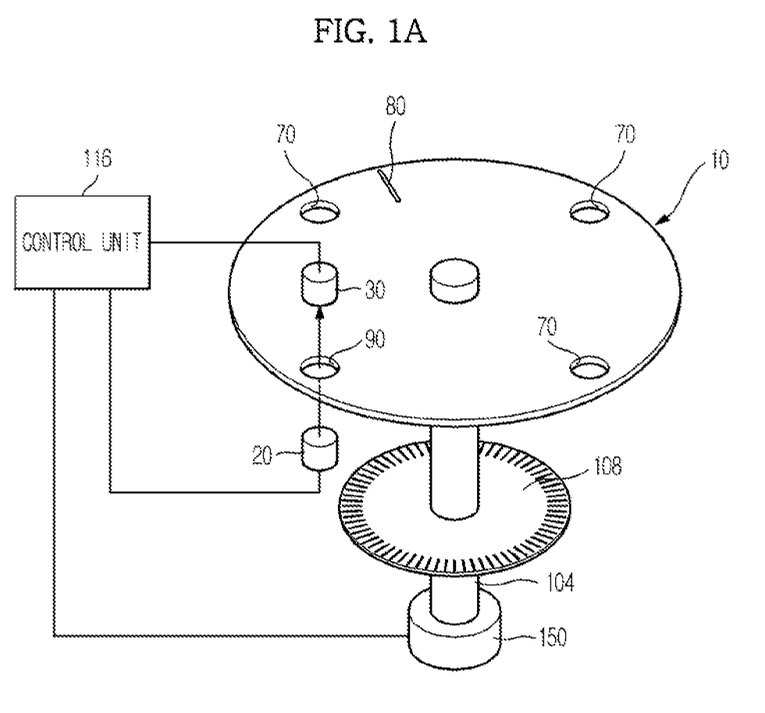
FIG. 1A is a view illustrating a schematic configuration of a light absorbance measurement apparatus in accordance with an exemplary embodiment.

Hereinafter, exemplary embodiments are described with reference to FIGS. 1 through 6. FIG. 1A is a view illustrating a schematic configuration of a light absorbance measurement apparatus in accordance with an exemplary embodiment. In FIG. 1A, a microfluidic device 10, motor 150, light source 20, optical detecting unit 30, slitted panel 108, such as a rotation angle detecting unit, and control unit 116 are illustrated.

The microfluidic device 10 is provided with detection chambers 70 that accommodate a test subject and a reference chamber 90 that provides a reference value for light absorbance detection. The microfluidic device 10 may have, for example, a disc shape. The detection chambers 70 and the reference chamber 90 are arranged in a rotation direction of the microfluidic device 10, for example, in a circumferential direction of the microfluidic device 10 when the microfluidic device 10 has a circular disc shape. The test subject is accommodated in the detection chambers 70. The reference chamber 90 serves to provide a reference for light absorbance measurement and may be empty or may be filled with distilled water or the like.

The motor 150 is used to rotate the microfluidic device 10. The motor 150 rotates the microfluidic device 10 to provide centrifugal force required to separate a supernatant from a sample and to move the separated supernatant to a specific location in the microfluidic device 10 as needed. The motor 150 also rotates the microfluidic device 10 to allow each of the detection chambers 70 and the reference chamber 90 to face the light source 20 and the optical detecting unit 30.

The light source 20 emits light having a specific wavelength to the detection chambers 70 and the reference chamber 90. For example, a light emitting diode (LED) may be employed as the light source 20. The optical detecting unit 30 detects optical characteristics, such as fluorescent, emission, and/or light absorbance characteristics of a material to be detected. For example, the optical detecting unit 30 may be a photo-sensor that generates a detection signal corresponding to the intensity of light that has been transmitted through the detection chambers 70 and the reference chamber 90.

The control unit 116 controls operation timings of the motor 150, the light source 20, and the optical detecting unit 30. For example, the control unit 116 detects a rotation phase of the motor 150 and controls the light source 20 and the optical detecting unit 30 to measure the intensity of light transmitted through the detection chamber 70 or the reference chamber 90 in synchronization with the detected rotation phase. For example, the microfluidic device 10 may be provided with a mark 80 to indicate a reference position. Angular distances between the mark 80, each detection chamber 70 and the reference chamber 90 are predetermined as a design specification of the microfluidic device 10. The control unit 116 may control operations of the light source 20 and the optical detecting unit 30 using the rotation speed of the microfluidic device 10 and the angular distances between the mark, the detection chamber 70 and the reference chamber 90 to allow the light source 20 and the optical detecting unit 30 to perform light absorbance detection when they face the detection chamber 70 or the reference chamber 90.

The control unit 116 detects the rotation angle of the motor 150 using a rotary encoder connected to the motor 150. In FIG. 1A, reference numeral 108 represents the slitted panel, such as a rotation angle detecting unit, constituting a part of the encoder.

Figure 1B:
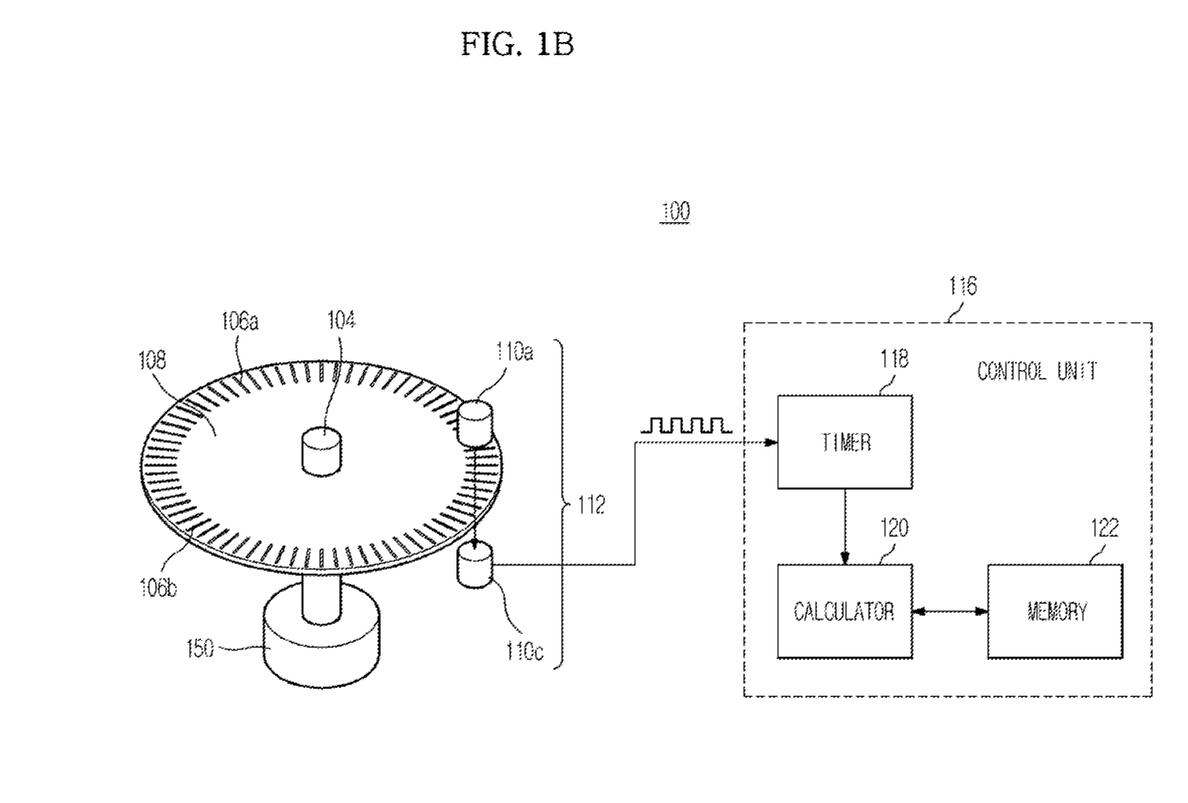
FIG. 1B is a view illustrating a rotary encoder in accordance with an exemplary embodiment.

FIG. 1B is a view illustrating the rotary encoder in accordance with an exemplary embodiment. The microfluidic device 10 illustrated in FIG. 1A generates centrifugal force via rotation, to separate a supernatant from a sample and to move the separated supernatant to a specific location in the microfluidic device 10. Also, the microfluidic device 10 rotates to allow the detection chamber 70 or the reference chamber 90 to face the light source 20 and the optical detecting unit 30. Since the rotation angle or revolutions per minute of the microfluidic device 10 may be accurately controlled when the rotation angle or revolutions per minute of the motor 150 is accurately detected, the positional error of the encoder is compensated for and substantially minimized as described in detail below.

As illustrated in FIG. 1B, the slitted panel 108 having a plurality of slits 106a is rotatably installed on a rotating shaft 104 that is rotated simultaneously with rotation of the motor 150. The slitted panel 108 is an example of a rotation angle detecting unit to detect the rotation angle of the motor 150 or the rotation of a load, such as the microfluidic device 10, that rotates along with the motor 150. Also, the slits 106a are an example of rotation angle detecting members provided at the rotation angle detecting unit. A light source 110a to emit light and an optical sensor 110c to generate pulse signals are arranged at opposite sides of the slitted panel 108 such that the plurality of slits 106a is interposed between the light source 110a and the optical sensor 110c. The light source 110a and the optical sensor 110c constitute an optical detecting unit 112. The plurality of slits 106a of the slitted panel 108 is located on an optical path, through which the optical sensor 110c detects light emitted from the light source 110a.

To identify each of the plurality of slits during rotation of the rotary encoder, the relative positions of the respective slits need to be determined. For example, a reference position may be set. The reference position may be set by use of the mark 80, such as a reference line, provided at the microfluidic device 10 that is rotated by the motor 150 as illustrated in FIG. 1A. Alternatively, the reference position may be set by a use of a motor's Z-phase of a relative position encoder, a time when power begins to be supplied to a motor, or the position of a reference slit formed in a slitted panel of an absolute position encoder. In the setting method using the motor's Z-phase, a pulse is generated at a specific position of a rotor whenever a motor rotates once, to allow relative positions of a plurality of slits to be determined based on pulses. In the setting method using the time when power begins to be supplied to a motor, a reference slit is a slit detected first after the power begins to be supplied to the motor.

Although FIG. 1B illustrates the reference position setting method using a reference slit 106b, the setting method using the motor's Z-phase, the setting method using the time when power begins to be supplied to the motor, and any other reference position setting methods and apparatuses may be used. In the case of the setting method using the time when power begins to be supplied to the motor, a lookup table generation in accordance with an exemplary embodiment is performed whenever the power is cycled to the motor.

The light source 110a and the optical sensor 110c detects light transmitted through the plurality of slits 106a of the slitted panel 108, thereby participating in measurement of the rotation angle of the slitted panel 108. The optical sensor 110c has a pulse generation circuit (not shown) to generate a series of pulse signals that reflect light receiving conditions. Specifically, the pulse generation circuit generates a pulse signal when the optical sensor 110c detects the light transmitted through each of the plurality of slits 106a. The number of slits 106a, through which the light emitted from the light source 110a is transmitted to the optical sensor 110c, is determined based on the number of pulses. Pulse signals generated from the optical sensor 110c are provided to a timer 118 of the control unit 116. The timer 118 provides a calculator 120 with information related to generation time of the pulse signals. The calculator 120 calculates the rotation angle of the slitted panel 118 based on time information provided by the timer 118. Data generated by the calculator 120 is stored in a memory 122. If the control unit 116 includes a microprocessor including a timer and a memory, an additional timer and a memory unit may be omitted and, thus, cost reduction may be achieved.

Figure 2A:
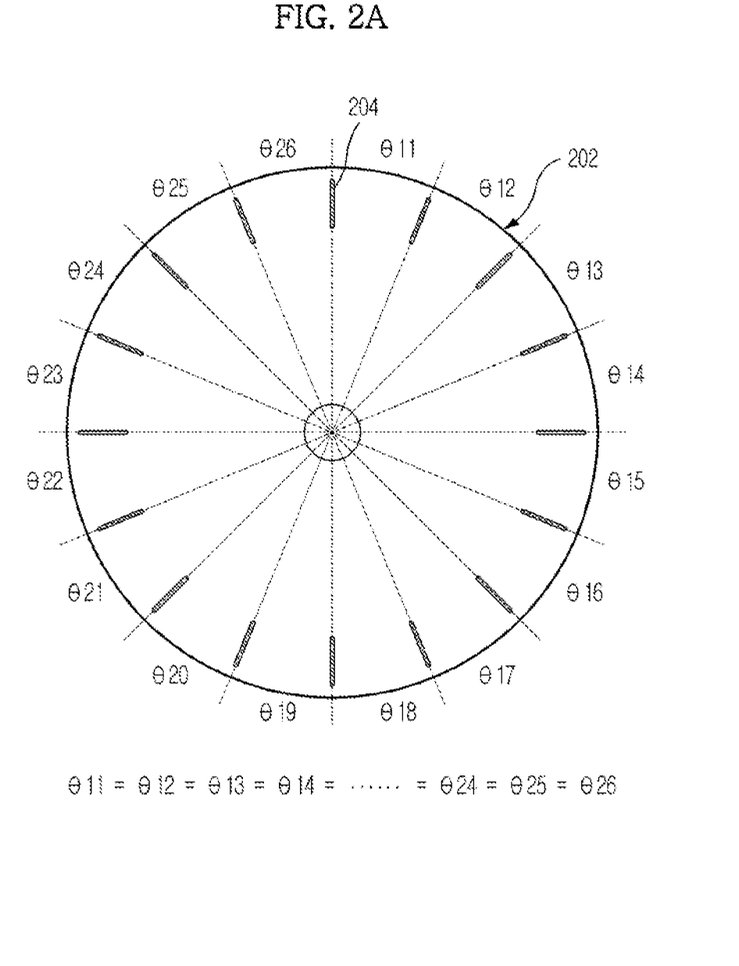
FIGS. 2A and 2B illustrate a disc of the rotary encoder with no error and a possible angular error, respectively.

FIG. 2A illustrates a normal slitted panel, in which a plurality of slits 204 is arranged at a slitted panel 202 at an equal distance or an angle. In FIG. 2A, the relation of $\theta11=\theta12=\theta13=\theta14=\theta15=\theta16=\theta17=\theta18=\theta19=\theta20=\theta21=\theta22=\theta23=\theta24=\theta25=\theta26$ is realized. The assumed angle and the actual angle of each of the plurality of slits 204 with respect to a reference position are equal to each other, and, thus, an accurate rotation angle of the slitted panel 202 may be measured.

Figure 2B:
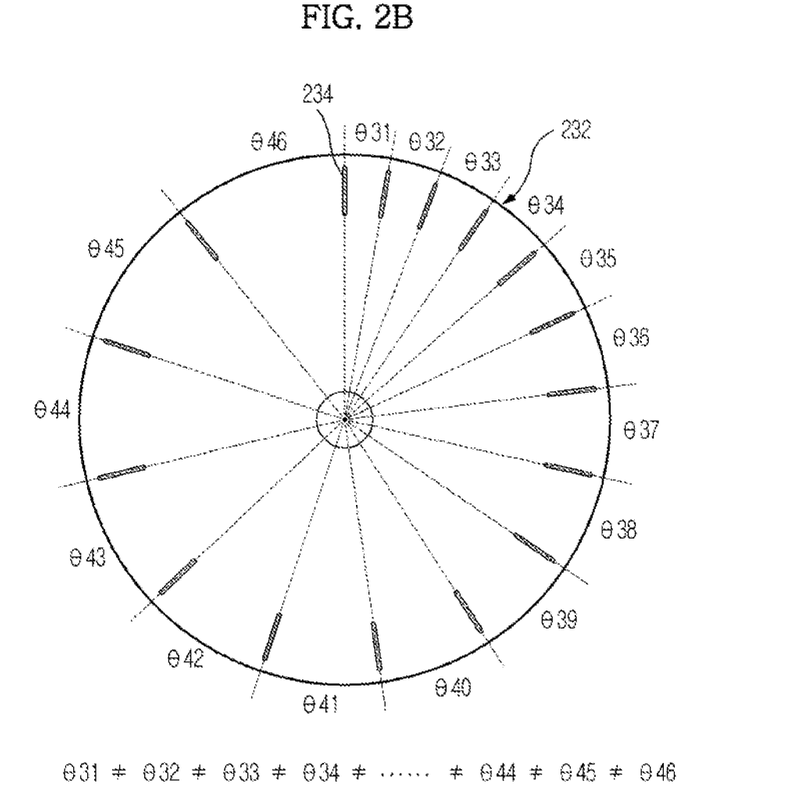

On the other hand, FIG. 2B illustrates an abnormal slitted panel, in which a plurality of slits 234 is arranged at a slitted panel 232 at unequal distances or angles. In FIG. 2B, the relation of $\theta31\neq\theta32\neq\theta33\neq\theta34\neq\theta35\neq\theta36\neq\theta37\neq\theta38\neq\theta39\neq\theta40\neq\theta41\neq\theta42\neq\theta43\neq\theta44\neq\theta45\neq\theta46$ is illustrated. The assumed angle and the actual angle of each of the plurality of slits 234 differ from each other, and, thus, the rotation angle of the slitted panel 232 may be measured inaccurately.

In an exemplary embodiment, if the assumed angle and the actual angle of each of the plurality of slits 234 differ from each other, as illustrated in FIG. 2B, a lookup table may be generated and used to reduce the angular error in detecting the plurality of slits 234.

As an example, the assumed angle and the actual angle of only some of the plurality of slits may differ from each other. In an exemplary embodiment, the lookup table may be generated and used to reduce the angular error of the erroneous slits.

Figure 3:
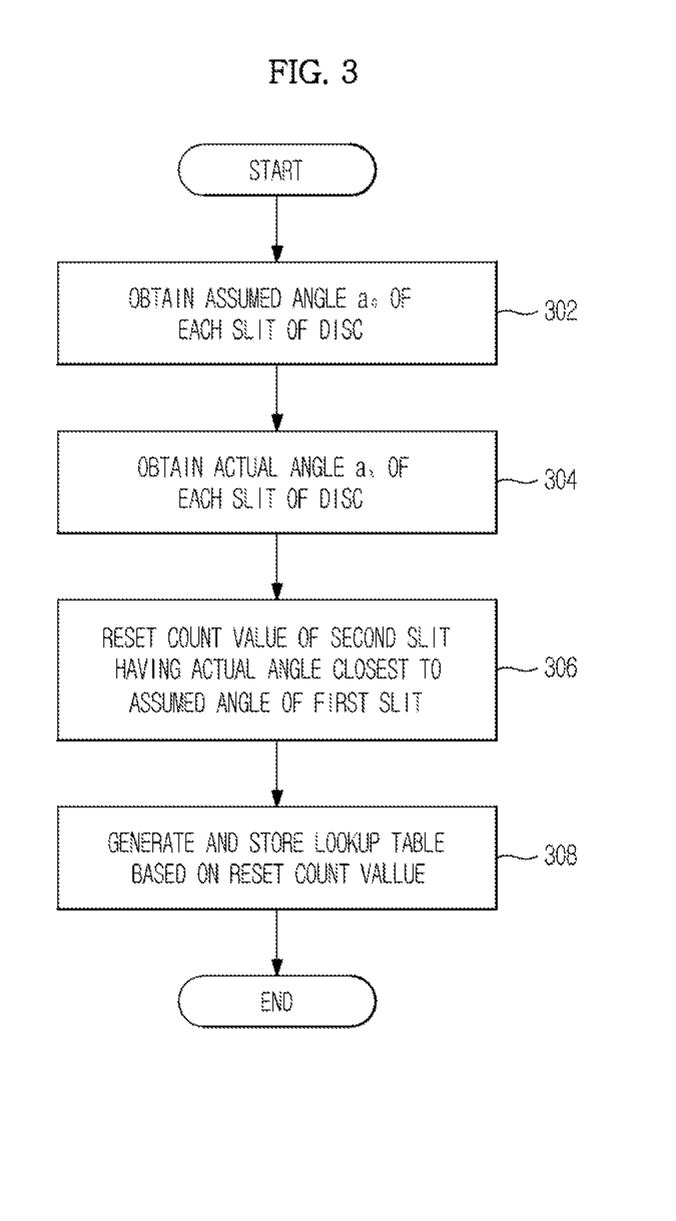
FIG. 3 is a flow chart illustrating a control method of the rotary encoder in accordance with an exemplary embodiment.

FIG. 3 is a flow chart illustrating a control method of the rotary encoder in accordance with an exemplary embodiment. As illustrated in FIG. 3, an assumed angle $a_0$ of each of the plurality of slits 106a of the slitted panel 108 is calculated, in operation 302. The assumed angle $a_0$ is an ideal angle of each of the plurality of slits 106a under the assumption that the plurality of slits 106a is arranged at an equal distance or an equal angle, thus, exhibiting no angular error. For example, if the number of the plurality of slits 106a is 4000, an angular difference between each of the equidistantly arranged slits 106a is 360°/4000=0.09° and the assumed angle $a_0$ of each of the plurality of slits 106a has a multiple value of 0.09° according to the position, as illustrated by the columns of count value $n_x$ and assumed angle $a_0$ of FIGS. 6A and 6B. The assumed angle $a_0$ may be calculated in advance from a specification providing the number of slits of the slitted panel 108 and may be stored in the memory 122 of the control unit 116, or may be calculated in real time as the control unit 116 detects the number of slits 106a based on a count value while the slitted panel 108 rotates once.

Next, the actual angle $a_x$ of each of the plurality of slits 106a formed in the slitted panel 108 is obtained in operation 304. For example, the rotation time $t_x$ taken from the position of the reference slit 106b, which is a reference position to the position of each of the plurality of slits 106a during constant speed rotation of the slitted panel 108 is obtained, and then, the angle of each of the plurality of slits 106a with respect to the reference slit 106b is calculated from the constant rotation speed of the slitted panel 108 and the measured rotation time $t_x$.

Once the assumed angle $a_0$ and the actual angle $a_x$ of each of the plurality of slits 106a are obtained, any erroneous slit, referred to as a first slit, the assumed angle $a_0$ and the actual angle $a_x$ of which differ from each other, is determined. Then, the count value ($n_x$ of FIGS. 6A and 6B) of another slit, referred to as a second slit, having the actual angle closest to the assumed angle $a_0$ of the first slit is reset to a new count value ($n_x'$ of FIGS. 6A and 6B) of the first slit, in operation 306. As the count value of the first slit having the assumed angle $a_0$ and actual angle $a_x$ different from each other is reset to provide the first slit with the new actual angle $a_x$ closer to the assumed angle $a_0$, the angular error $e_x$ of the first slit is reduced after resetting the count value of the first slit. If the first slit fails to find a substitute count value required to reduce the angular error $e_x$ among the plurality of slits 106a, i.e. if the angular error $e_x$ is not reduced even after the first slit is reset to the substitute count value, the first slit maintains an original count value.

When identifying the first slit having the assumed angle $a_0$ and actual angle $a_x$ different from each other, if the angular error $e_x$ between the assumed angle $a_0$ and the actual angle $a_x$ of a slit is within an allowable range, it may be assumed that the assumed angle $a_0$ and the actual angle $a_x$ of the slit are substantially equal to each other. If the angular error $e_x$ between the assumed angle $a_0$ and the actual angle $a_x$ of a slit exceeds the allowable range, it may be assumed that the assumed angle $a_0$ and the actual angle $a_x$ of the slit differ from each other and the corresponding slit is determined as the first slit.

A lookup table is generated by reflecting the new count value of the first slit and the original count values of the remaining slits and is stored in the control unit 116, in operation 308. The control unit 116 compares the count value determined according to the rotation angle of the slitted panel 108, for example, a value representing the number of slits having passed through the optical sensor, with the count value of the lookup table, and determines the rotation angle of the slitted panel 108 based on the result of comparison.

Figure 4:
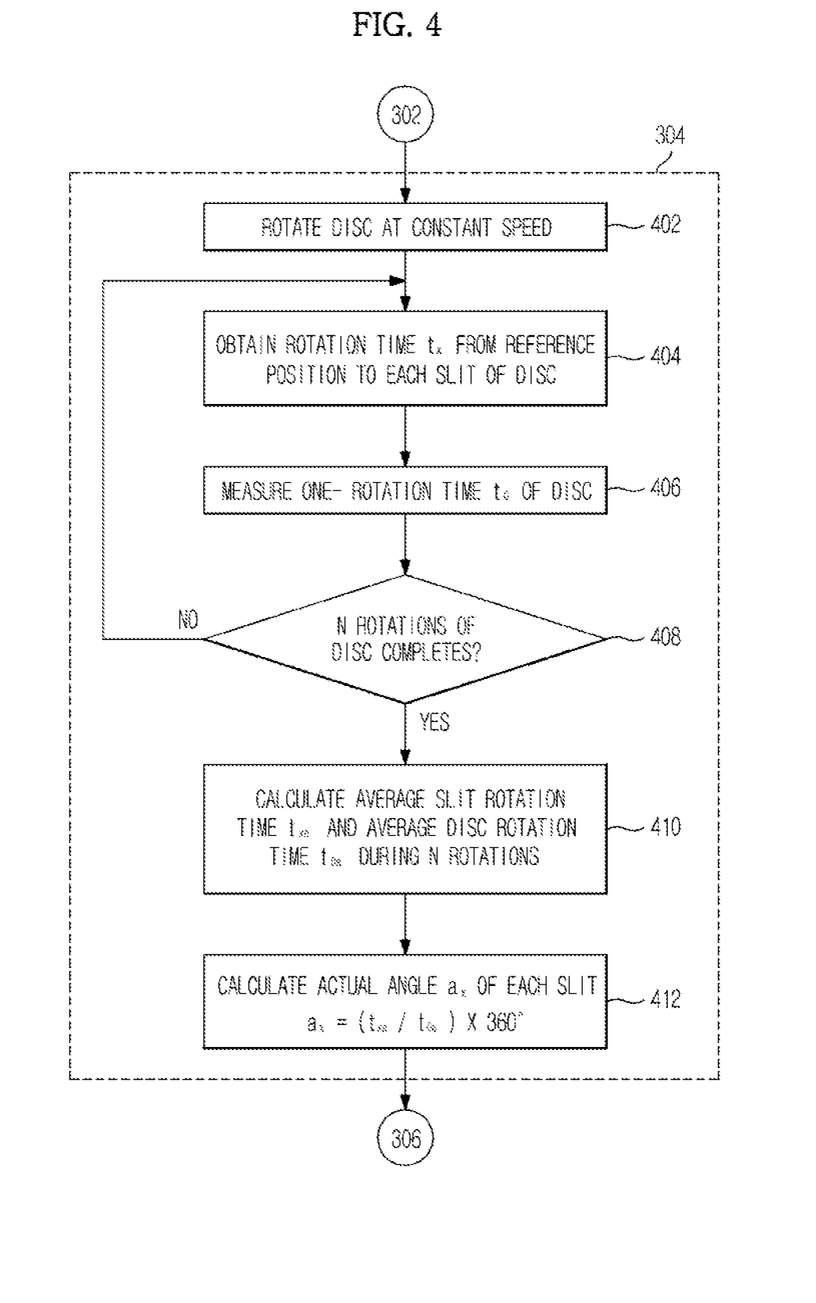
FIG. 4 is a flow chart illustrating an operation to obtain the actual angle of each of a plurality of slits in detail.
Figure 5:
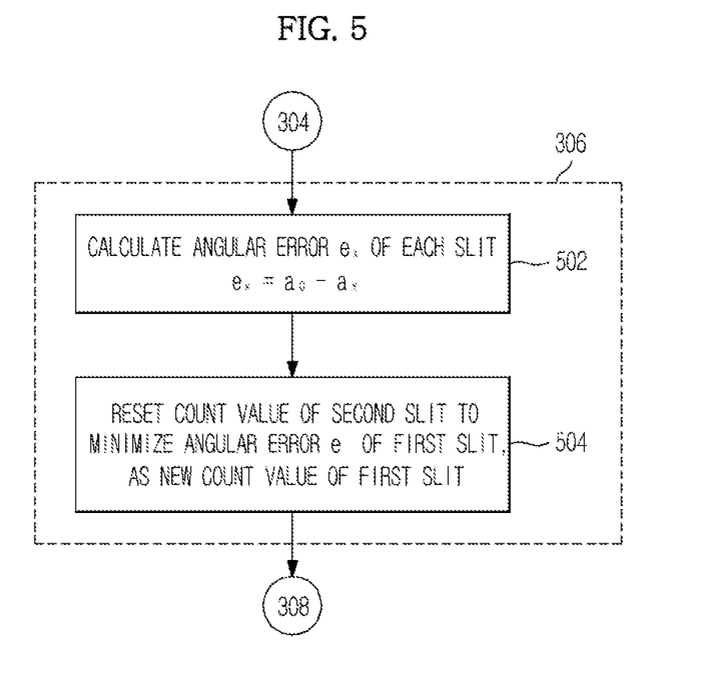
FIG. 5 is a flow chart illustrating an operation to reset to a new count value in detail.
Figure 6A:
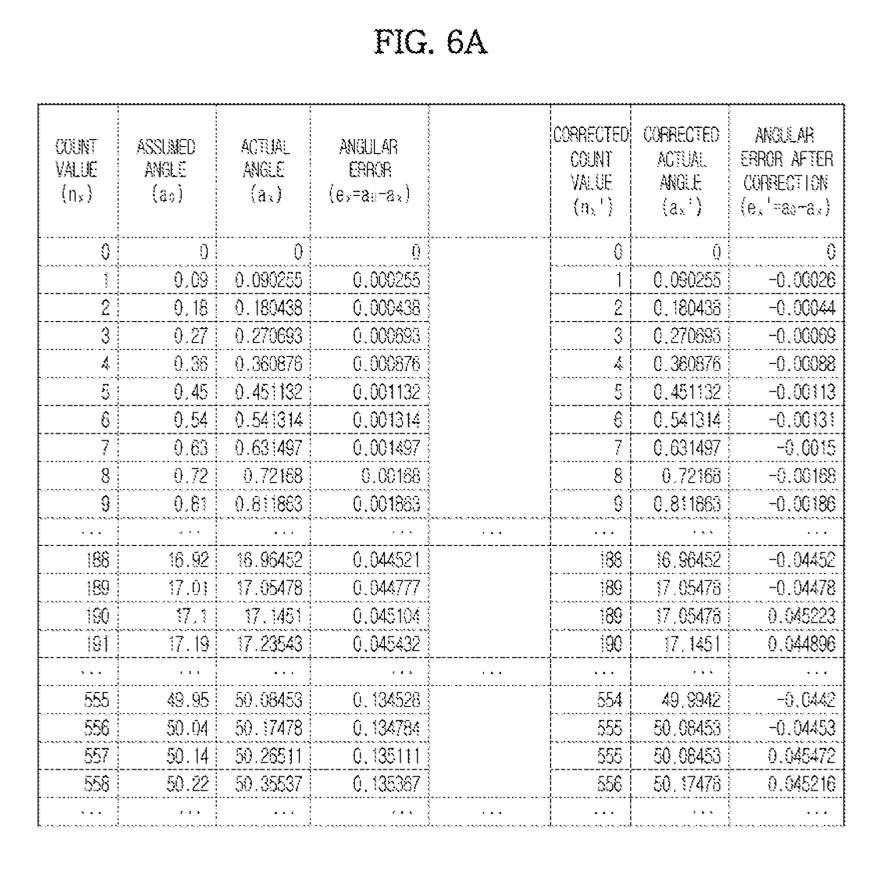
FIGS. 6A and 6B are view illustrating data and variation thereof obtained during implementation of the control method of the rotary encoder in accordance with an exemplary embodiment.
Figure 6B:
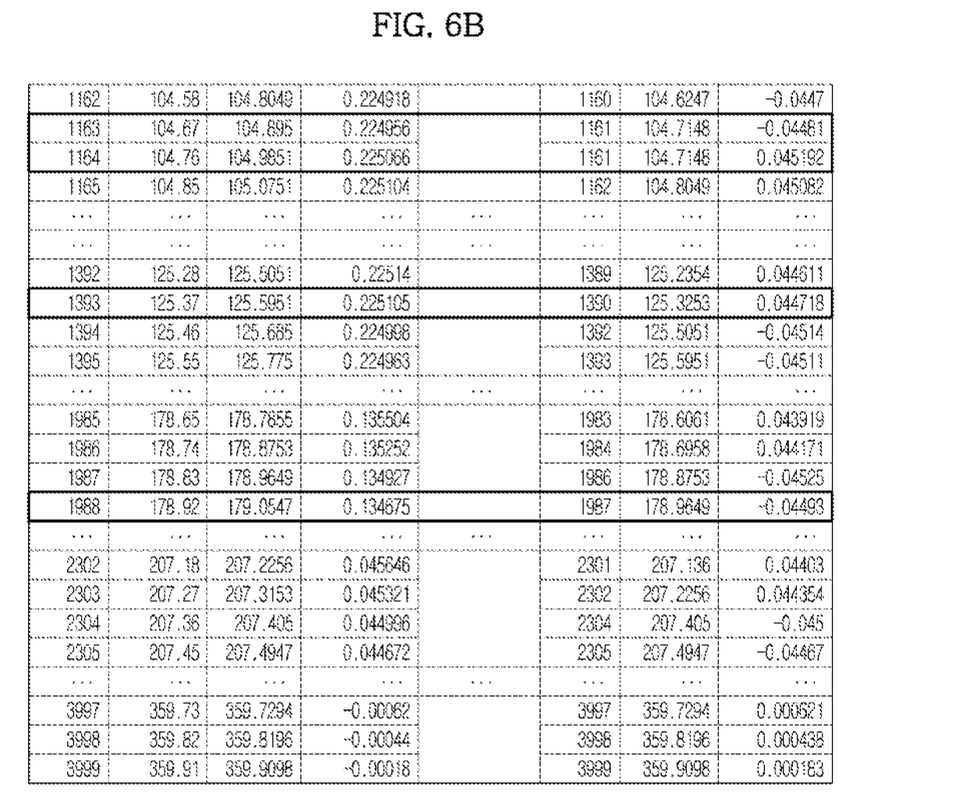

FIG. 4 illustrates an operation to obtain the actual angle of each of the plurality of slits of operation 304 illustrated in FIG. 3 in more detail, and FIG. 5 illustrates an operation to reset to the new count value of operation 306 illustrated in FIG. 3 in more detail. FIGS. 6A and 6B illustrates data and variation thereof obtained during implementation of the control method of the rotary encoder.

In FIG. 4, in the operation 304 to obtain the actual angle $a_x$ of each of the plurality of slits 106a formed in the slitted panel 108, the slitted panel 108 is rotated at a constant speed (operation 402). When the stationary motor 150 starts rotating, the motor 150 does not rotate at a constant speed during the initial rotation stage. Therefore, a time to stabilize the rotation speed of the motor 150 and the slitted panel 108 is needed after the rotation of the motor 150 begins. The time to stabilize the rotation speed of the slitted panel 108 may be preset via a test run of the motor 150 and the slitted panel 108.

When the preset time to stabilize the rotation speed of the slitted panel 108 is lapsed, it is assumed that the slitted panel 108 is traveling at a constant speed, and then, the rotation time $t_x$ taken from the reference slit 106b to each of the plurality of slits 106a is obtained in operation 404.

While the slitted panel 108 rotates once, the rotation time $t_x$ of each of the plurality of slits 106a is obtained and subsequently the one-rotation time $t_0$ of the slitted panel 108 is obtained in operation 406. The one-rotation time $t_0$ of the slitted panel 108 may be a time required to rotate the slitted panel 108 once on the basis of the reference line 80 of the microfluidic device 10, a Z-phase position, a power supply beginning time, a reference slit position, or the like. In an exemplary embodiment, in consideration of a measurement error or a constant-speed control error of the slitted panel 108, the slitted panel 108 is rotated at preset revolutions per minute, for example, for n rotations, and the rotation time $t_x$ of each of the plurality of slits 106a and the one-time rotation time $t_0$ of the slitted panel 108 are obtained for each rotation of the slitted panel 108. The resulting average values are used to generate the lookup table. That is, the acquisition of the rotation time $t_x$ of each of the plurality of slits 106a (operation 404) and the acquisition of the one-rotation time $t_0$ of the slitted panel 108 (operation 406) are repeated until n rotations of the slitted panel 108 are completed.

After n rotations of the slitted panel 108 are completed, (the result of operation 408 is Yes), the average slit rotation time $t_{xa}$ of each of the plurality of slits 106a and the average disc rotation time $t_{0a}$ of the slitted panel 108 are calculated in operation 410. Specifically, if the slitted panel 108 is rotated n times and the rotation time $t_x$ of each of the plurality of slits 106a is measured n times, the measured values of the rotation time $t_x$ are averaged to calculate the average slit rotation time $t_{xa}$ of the corresponding slit. In this way, the average slit rotation time of the plurality of slits 106a is measured starting from the average slit rotation time $t_{1a}$ of the first slit to the average slit rotation time $t_{4000a}$ of the last 4000$^{th}$ slit, if the number of slits is 4000, for example. The average disc rotation time $t_{0a}$ of the slitted panel 108 is obtained by averaging all of the values of one-rotation time $t_0$ of the slitted panel 108 measured during n rotations of the slitted panel 108.

Once the average slit rotation time $t_{xa}$ of the plurality of slits 106a and the average disc rotation time $t_{0a}$ of the slitted panel 108 are obtained, the actual angle $a_x$ of each of the plurality of slits 106a is calculated using the calculated two average time values in operation 412. The actual angle $a_x$ of each of the plurality of slits 106a is calculated as $a_x=(t_{xa}/t_{0a})\times 360°$. When only a single value of one-rotation time of the slitted panel 108 is used instead of the average disc rotation time, the actual angle $a_x$ is calculated as $a_x=(t_x/t_0)\times 360°$.

Referring to FIG. 5 illustrating an operation to reset to the new count value in more detail, the angular error $e_x$ of each of the plurality of slits 106a is calculated from a difference between the assumed angle $a_0$ of each of the plurality of slits 106a and the actual angle $a_x$ of each of the plurality of slits 106a, in operation 502. The angular error $e_x$ is calculated by $e_x=a_0-a_x$.

With respect to the first slit having the assumed angle $a_0$ and the actual angle $a_x$ different from each other, the given count value of the second slit that has the actual angle to minimize the angular error $e_x$ of the first slit is reset to the new count value which is equal to the given count value of the first slit with reference to the actual angle $a_x$ and the angular error $e_x$ of each of the plurality of slits 106a, in operation 504.

The operation to reset the count value is described below with reference to FIGS. 6A and 6B. In one example, if the slitted panel 108 has 4000 slits and thus, has count values from 0 to 3999 and also, each of the plurality of slits has the actual angle $a_x$ as represented in FIGS. 6A and 6B, the assumed angle $a_0$ of the $1163^{th}$ slit corresponding to the pre-correction count value of 1163 is 104.67° from the reference position, but the actual angle $a_{1163}$ of the $1163^{rd}$ slit is 104.895°. Thus, there is the angular error $e_x$ of 0.224956°. However, after resetting the count value, the count value $n_x$ of the $1163^{rd}$ slit is changed from 1163 to 1161, and thus, the actual angle $a_x$ of the $1163^{rd}$ slit is changed from the pre-correction angle of 104.895° to the post-correction angle of 104.7148°. The angular error between the assumed angle $a_0$ of the $1163^{th}$ slit and the pre-correction actual angle is 104.67°−104.895°=−0.224956°, while the angular error between the assumed angle $a_0$ and the post-correction actual angle is 104.67°−104.7148°=−0.04481°. Thus, it will be appreciated that the post-correction angular error is substantially smaller than the pre-correction angular error and the substituted post-correction actual angle is much closer to an ideal angle than the pre-correction actual angle.

In the case of the $1164^{th}$ slit corresponding to the pre-correction count value of 1164, it will be appreciated that the angular error is reduced after correction and the substituted post-correction actual angle is much closer to an ideal angle than the pre-correction actual angle. Note that both the $1163^{rd}$ slit and the $1164^{th}$ slit have the same post-correction count value of 1161. The two different slits, which have the same new count value as described above, may have the same angular error reduction effects via resetting of the count value and may ensure successful detection of the rotation angle.

In another example, the assumed angle $a_0$ of the $1393^{rd}$ slit corresponding to the pre-correction count value of 1393 is 125.37° from the reference position and the actual angle $a_{1393}$ of the $1393^{rd}$ slit is 125.5951°. Thus, there is the angular error $e_x$ of 0.225105°. However, after resetting the count value, the count value $n_x$ of the $1393^{rd}$ slit is changed from 1393 to 1390, and thus, the actual angle $a_x$ of the $1393^{rd}$ slit is changed from the pre-correction angle of 125.5951° to the post-correction angle of 125.3253°. Although the angular error between the assumed angle $a_0$ of the $1393^{rd}$ slit and the pre-correction actual angle is 125.37°−125.5951°=−0.2251°, the angular error between the assumed angle $a_0$ and the post-correction actual angle is 125.37°−125.3253°=−0.0447°. Thus, it will be appreciated that the post-correction angular error is substantially smaller than the pre-correction angular error and the substituted post-correction actual angle is much closer to an ideal angle than the pre-correction actual angle.

As another example, the assumed angle $a_0$ of the $1988^{th}$ slit corresponding to the pre-correction count value of 1988 is 178.92° from the reference position and the actual angle $a_{1988}$ of the $1988^{th}$ slit is 179.0547°. Thus, there is the angular error $e_x$ of 0.134675°. However, after resetting the count value, the count value $n_x$ of the $1988^{th}$ slit is changed from 1988 to 1987, and the actual angle $a_x$ of the $1988^{th}$ slit is changed from the pre-correction angle of 179.0547° to the post-correction angle of 178.9649°. Although the angular error between the assumed angle $a_0$ of the $1988^{th}$ slit and the pre-correction actual angle is 178.92°−179.0547°=−0.1347°, the angular error between the assumed angle $a_0$ and the post-correction actual angle is 178.92°−178.9649°=−0.0449°. Thus, it will be appreciated that the post-correction angular error is substantially smaller than the pre-correction angular error and thus, the substituted post-correction actual angle is much closer to an ideal angle than the pre-correction actual angle.

Although FIGS. 1 to 6 illustrate the optical encoder as an example, an exemplary embodiment may be used with a magnetic encoder. Specifically, in relation to the magnetic encoder, the lookup table is generated and operated as a positional error of each rotation angle detecting member of a rotation angle detecting unit is corrected by the method of FIGS. 1 to 6, resulting in a substantial reduction in positional error.

As is apparent from the above description, in a rotary encoder and a control method in accordance with an aspect of an exemplary embodiment, even if each of a plurality of slits formed in a disc of the rotary encoder has an angular error between the assumed angle and the actual angle, it is possible to compensate for and reduce the angular error, resulting in enhanced detection reliability in the rotation angle of the plurality of slits of the encoder.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control method of a rotary encoder comprising a rotation angle detecting unit provided with a plurality of rotation angle detecting members, each of which has a given count value, the control method comprising:
    obtaining an assumed angle and an actual angle of each of the plurality of rotation angle detecting members;
    determining a first rotation angle detecting member, the assumed angle and the actual angle of which differ from each other, among the plurality of rotation angle detecting members;
    determining a second rotation angle detecting member having the actual angle closest to the assumed angle of the first rotation angle detecting member;
    resetting the given count value of the second rotation angle detecting member to a new count value of the first rotation angle detecting member; and
    changing the actual angle of the first rotation angle detecting member via the new count value of the first rotation angle detecting member to reduce an angular error between the assumed angle and the actual angle of the first rotation angle detecting member.

2. The method according to claim 1, wherein the obtaining the actual angle comprises calculating an angle between a reference position and each of the plurality of the rotation angle detecting members from a rotation time taken from the reference position to each of the plurality of the rotation angle detecting members during constant speed rotation of the rotation angle detecting unit.

3. The method according to claim 2, further comprising rotating the rotation angle detecting unit for a preset time to stabilize a rotation speed of the rotation angle detecting unit to the constant speed.

4. The method according to claim 2, wherein the reference position is determined by a reference line provided on a microfluidic device that is rotated by a motor.

5. The method according to claim 2, wherein the reference position is determined by a reference line of a motor that rotates the rotation angle detecting unit.

6. The method according to claim 2, wherein the reference position is determined by a time when power begins to be supplied to a motor that rotates the rotation angle detecting unit.

7. The method according to claim 6, wherein the resetting the given count value is performed each time the power begins to be supplied to the motor.

8. The method according to claim 1, further comprising:
generating a lookup table based on a relationship between the given count value and the new count value of the first rotation angle detecting member, for the plurality of rotation angle detecting members; and
controlling the rotary encoder based on the lookup table.

9. A rotary encoder comprising:
a rotation angle detecting unit comprising a plurality of rotation angle detecting members, each of which has a given count value; and
a control unit that:
obtains an assumed angle and an actual angle of each of the plurality of rotation angle detecting members,
determines a first rotation angle detecting member, the assumed angle and the actual angle of which differ from each other, among the plurality of rotation angle detecting members,
determines a second rotation angle detecting member having the actual angle closest to the assumed angle of the first rotation angle detecting member,
resets the given count value of the second rotation angle detecting member to a new count value of the first rotation angle detecting member, and
changes the actual angle of the first rotation angle detecting member via the new count value of the first rotation angle detecting member to reduce an angular error between the assumed angle and the actual angle of the first rotation angle detecting member.

10. The rotary encoder according to claim 9, wherein:
the rotation angle detecting unit comprises a slitted panel that is rotated by a motor; and
the rotation angle detecting members comprise a plurality of slits formed in the slitted panel.

11. The rotary encoder according to claim 10, further comprising:
an optical detecting unit that emits light to the plurality of slits of the slitted panel, receives the light transmitted through the plurality of slits, and generates an electric pulse when the light is received.

12. The rotary encoder according to claim 10, wherein the control unit comprises:
a timer which detects a time from a reference time to a generation time of each electric pulse;
a calculator which calculates a rotation angle of the rotation angle detecting unit based on the detected time; and
a memory which stores data calculated by the calculator.

13. The rotary encoder according to claim 12, wherein the timer and the memory are embodied as interior parts of the control unit.

14. A control method of a rotary encoder comprising a disc provided with a plurality of slits, each of which has a given count value, the control method comprising:
obtaining an assumed angle and an actual angle of each of the plurality of slits;
determining a first slit, the assumed angle and the actual angle of which differ from each other, among the plurality of slits;
determining a second slit having the actual angle closest to the assumed angle of the first slit; and
resetting the given count value of the second slit to a new count value of the first slit, to reduce an angular error between the assumed angle and the actual angle of the first slit.

15. A rotary encoder comprising:
a disc comprising a plurality of slits, each of which has a given count value; and
a control unit that:
obtains an assumed angle and an actual angle of each of the plurality of slits,
determines a first slit, the assumed angle and the actual angle of which differ from each other, among the plurality of slits,
determines a second slit having the actual angle closest to the assumed angle of the first slit, and
resets the given count value of the second slit to a new count value of the first slit, to reduce an angular error between the assumed angle and the actual angle of the first slit.

* * * * *